(12) United States Patent
Wilkerson et al.

(10) Patent No.: US 6,280,596 B1
(45) Date of Patent: Aug. 28, 2001

(54) ELECTROLYTIC TINPLATING OF STEEL SUBSTRATE AND APPARATUS

(75) Inventors: Ralph Wilkerson, Wintersville, OH (US); John A. Sinsel, Weirton, WV (US); Tony Georgetti, McDonald; Eugene J. Chelen, New Alexandria, both of PA (US); Lowell W. Austin, Weirton, WV (US)

(73) Assignee: Weirton Steel Corporation, Weirton, WV (US)

( * ) Notice: Subject to any disclaimer, the term of this patent is extended or adjusted under 35 U.S.C. 154(b) by 0 days.

(21) Appl. No.: 09/410,557

(22) Filed: Oct. 1, 1999

Related U.S. Application Data

(63) Continuation of application No. 09/076,979, filed on May 13, 1998, now Pat. No. 5,928,487, which is a continuation-in-part of application No. 08/445,530, filed on May 23, 1995, now Pat. No. 5,599,395.
(60) Provisional application No. 60/102,645, filed on Oct. 1, 1998.

(51) Int. Cl.⁷ .............................. C25D 7/06; C25D 3/30; C25D 17/00; H01S 4/00; C25B 9/00
(52) U.S. Cl. .................. 205/140; 205/154; 205/302; 204/211; 204/269; 29/592.1; 428/544
(58) Field of Search ..................... 205/140, 154, 205/300–304; 204/211, 269; 29/592.1; 428/544

(56) References Cited

U.S. PATENT DOCUMENTS

| | | | | |
|---|---|---|---|---|
| 4,446,156 | * | 5/1984 | Salm | 205/300 X |
| 5,628,893 | * | 5/1997 | Opaskar | 205/300 |

* cited by examiner

*Primary Examiner*—Donald R. Valentine
(74) *Attorney, Agent, or Firm*—Shanley and Baker

(57) ABSTRACT

Methods and apparatus enabling simultaneous electrolytic tinplating of bottom and top surfaces of continuous-strip flat-rolled steel substrate while moving in the direction of its length, are disclosed. Both surfaces are plated in a first cell of a multi-cell horizontally-oriented tinplating line. The stannous ion plating source and the source of electrical power, for each surface, differ. Tin pellets for an upper surface anode are confined in a solution-permeable material confined, within an electrically-conductive lining. Dissolution of surface iron from the steel strip is substantially eliminated, improving the stannous ion plating solution quality, eliminating requirements for harmful additives, and increasing the variety of electrolytically tinplated continuous-strip steel products and processes.

18 Claims, 6 Drawing Sheets

ELECTROLYTIC TINPLATING OF STEEL SUBSTRATE AND APPARATUS

RELATED APPLICATIONS

This application claims the priority benefit of co-owned and copending U.S. patent application Ser. No. 60/102,645 filed Oct. 1, 1998 entitled ELECTROLYTIC TINPLATING OF STEEL SUBSTRATE, and is a continuation-in-part of: co-owned U.S. patent application Ser. No. 08/445,530 filed May 23, 1995, entitled APPARATUS FOR CONTINUOUS FLAT-ROLLED STEEL STRIP CLEANING AND FINISHING OPERATIONS (now U.S. Pat. No. 5,599,395), and co-owned U.S. patent application Ser. No. 09/076,979, filed May 13, 1998, entitled ELECTROLYTIC PLATING OF STEEL SUBSTRATE (now U.S. Pat. No. 5,928,487).

INTRODUCTION

This invention relates to new electrolytic tinplating processes, apparatus and product; and, more particularly, is concerned with continuous-strip acidic-electrolyte tinplating lines utilizing horizontally-oriented plating cells which eliminate chemical dissolution of surface iron from steel substrate into stannous-ion acidic plating solutions.

OBJECTS OF THE INVENTION

A major object of the invention is to enable continued commercial usage of horizontally-oriented electrolytic tinplating lines which use acidic stannous-ion plating solutions. Eliminating dissolution of iron from an exposed surface of continuous-strip steel is important in achieving that object.

An added object is elimination of environmental concern, previously associated with horizontally-oriented continuous-line tinplating practice, which resulted from utilizing cyanide compounds to precipitate surface iron dissolved from steel substrate in prior horizontally-oriented acidic stannous-ion plating cells.

A specific object of the invention is eliminating loss of stannous plating ions, primarily due to surface iron dissolution, from halogen-bath or methylsulfonic acid tinplating solutions during horizontally-oriented tinplating operations.

The above, and other contributions and advantages of the invention are described in greater detail with reference to the accompanying drawings in which like reference numbers are used for like parts, whenever possible, in the various drawings briefly described below.

DETAILED DESCRIPTION OF THE INVENTION

Figure 1:
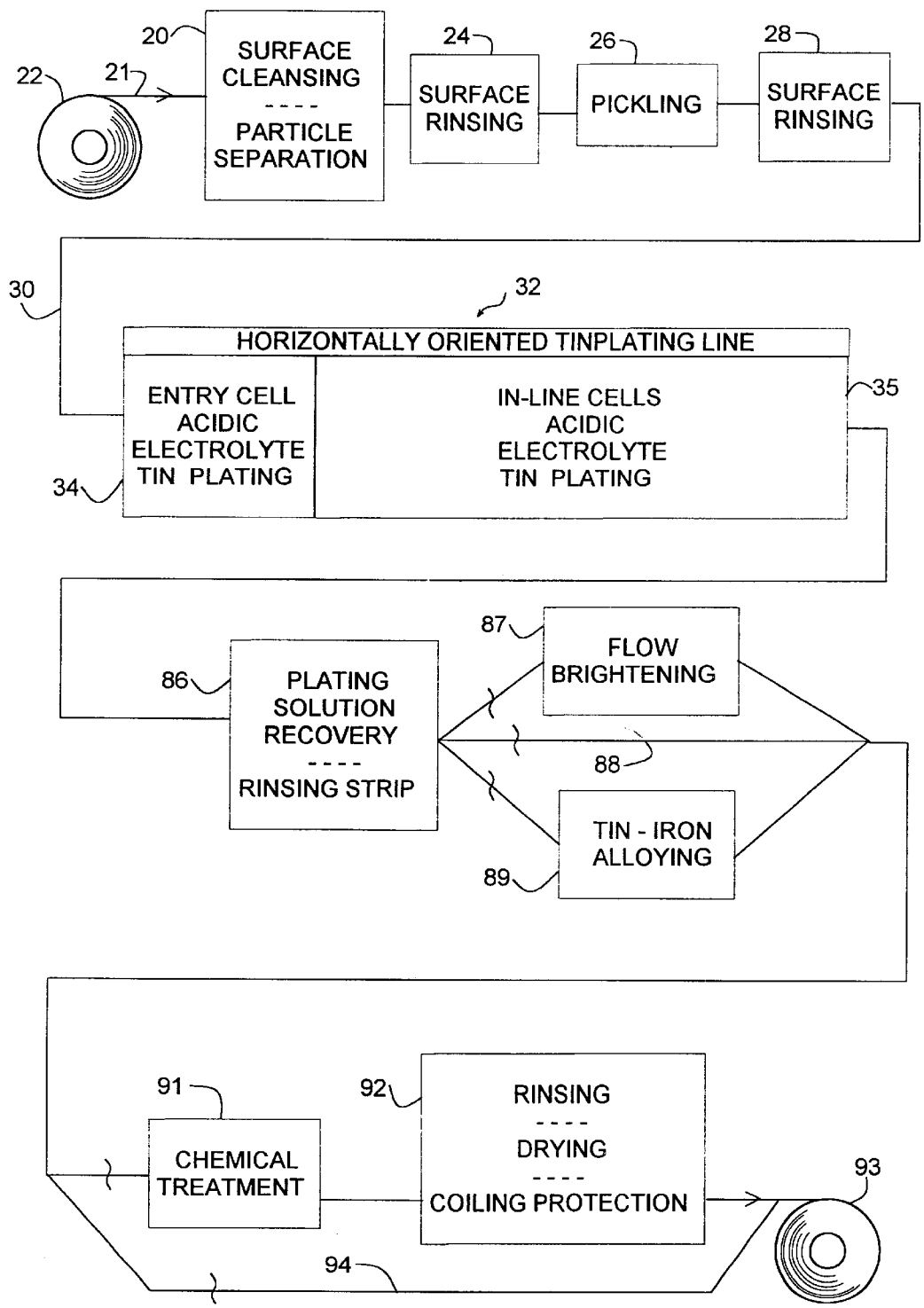
FIG. 1 is a general arrangement box diagram presentation for describing the relationship of a new combination of process steps and apparatus of the invention for carrying out acidic stannous ion tinplating operations during passage of continuous-strip steel, through a plurality of horizontally-oriented plating cells, free of surface dissolution of iron.

Continuous-strip steel is selectively processed to desired thickness gauge and to establish desired substrate characteristics for intended use of an electrolytically tinplated product. Such processing includes cold rolling gauge reduction, an annealing-type heat treatment, temper rolling to establish desired substrate temper, and side-trimming for uniform width dimension.

Preparation of steel strip surface for electrolytic plating preferably removes and separates iron fines and other surface contaminants resulting largely from cold reduction operation. In-line surface cleansing operations are carried out at station 20 (FIG. 1) on continuous-strip steel 21 from coil 22. Surface scrubbing, with separation of such contaminants from the cleansing solution, is described in more detail in copending and co-owned U.S. patent application Ser. No. 08/445,530 entitled APPARATUS FOR CONTINUOUS FLAT-ROLLED STEEL STRIP CLEANSING AND FINISHING OPERATION (now U.S. Pat. No. 5,599,395), which is included herein by reference.

Following such cleansing and rinsing of the strip at rinse station 24, surface oxide is removed at station 26, preferably by acid pickling. Surface rinsing at station 28 is carried out prior to further processing.

The horizontally-oriented plating line of the invention presents an entry cell which simultaneously plates both top surface and bottom surface of continuous-strip horizontally-oriented steel substrate, with each such surface being plated from a separate and distinct soluble tin anode.

In practice of the invention, surface-prepared continuous-strip steel substrate 30 enters a horizontally-oriented electrolytic plating line 32 solely through entry cell 34; both top and bottom surfaces of such horizontally-oriented substrate are plated simultaneously in entry cell 34.

Plating control in such entry cell, as described later herein, prevents surface dissolution of iron during passage through such entry cell, and through subsequent individual horizontally-oriented plating cells indicated by station 35 of FIG. 1.

Removal, at stations 20 to 28, of continuous-strip surface iron fines and iron oxides (as described above) prior to electrolytic plating, and other steps described later, help to diminish iron contamination of a stannous ion acidic plating solution. However, the overwhelmingly predominant source of iron contamination in prior horizontally-oriented halogen-bath tinplating practice has been found to originate from dissolution of iron from the top surface of the steel strip which, previously, was not plated in the first tier of a two-tier electrolytic plating line, as previously practiced in such horizontally-oriented tinplating of both bottom and top surfaces of a steel strip.

Only the bottom surface of the strip was previously tinplated as the strip traveled, with such bottom surface submersed at plating solution surface level, through a plurality of horizontally-oriented cells in a first tier of a two-tier line (see "The Technology of Tinplate," by W. E. Hoare, et al. ©1965, St. Marten's Press New York, N.Y. 10010, pages 239–244.) which is included herein by reference. However, iron, from the opposed "top" surface of the steel substrate, dissolved in the acidic plating solution, as it traveled is such first tier.

Acidic halogen-bath (approximate pH of 3.5) plating solution previously predominated in such two-tier horizontally-oriented lines. However, methylsulfonic acid plating solution (approximate pH of 1.0) is finding increased usage and, due to its pH, increases the potential for such undesirable dissolution of surface iron.

The presence of iron in both plating solutions promotes the conversion of bivalent stannous plating ions to quadrivalent stannic ions as dissolved ferric ions are converted to ferrous ions. The increase in stannic ions decreases the stannous ions available for tinplating, and the loss of plating efficiency is significant (see Bethlehem Steel U.S. Pat. No. 4,073,701 which is included herein by reference). Cyanide compounds have been used in order to precipitate such dissolved iron. The precipitate is referred to as "prussian blue" and is a matter of increasing environmental concern which threatens the existence of otherwise advantageous horizontally-oriented tin mill practice.

The present invention functions to electrolytically tinplate both surfaces of the steel substrate simultaneously in an entry cell which is the sole access of substrate for plating in a horizontally-oriented plating line, thus eliminating dissolution of surface iron due to exposure of the substrate surface to such acidic plating solution.

The invention includes both single-tier and two-tier plating line embodiments for purposes of producing new tin mill product, as described later herein. The simultaneous plating of both surfaces of the steel substrate upon entry to a horizontally-oriented plating line, made possible by the invention, is carried out in the entry cell of such single-tier embodiment, and in the entry cell of the first tier of a two-tier embodiment of the invention.

An additional factor decreasing plating efficiency is the introduction of oxygen from the atmosphere into the plating bath by strip movement and bath agitation. Such presence of oxygen results in the oxidation of bivalent tin ions to quadrivalent tin ions and a resulting decrease in plating efficiency. To reduce such oxidation, a suitable antioxidant is incorporated with the bath. Such antioxidants are available from Atotech USA, Inc., 100 Harvard Avenue, Cleveland, Ohio 44109.

Figure 2:
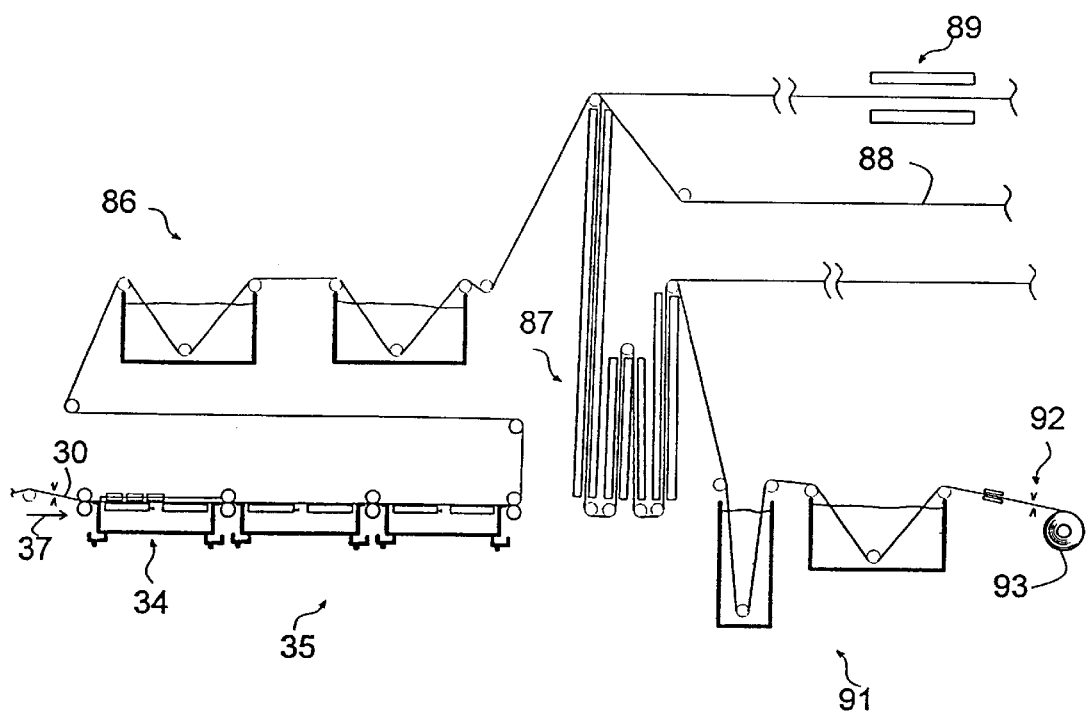
FIG. 2 is a diagrammatic elevational view, partially in cross section, of a single-tier horizontally-oriented tinplating line made possible by the invention.
Figure 3:
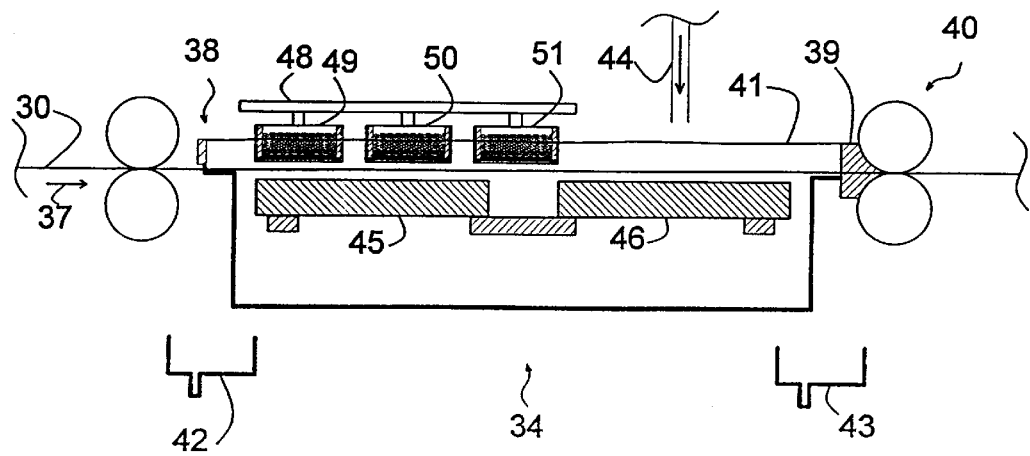
FIG. 3 is an enlarged schematic cross-sectional view of a portion of FIG. 2, for describing a horizontally-oriented entry cell of the invention.

FIG. 2 shows a single-tier embodiment and FIG. 3 shows an enlarged cross-sectional view of entry cell 34. The direction of travel for strip 30 is indicated by arrow 37 in both figures.

An early step of the invention elevates the surface level of the plating solution of entry cell 34 so as to enable plating of the top surface simultaneously with plating of the bottom surface of the horizontally-travelling strip.

A combination of strip entry and strip exit structures in such entry cell enables at least partial submersion of a soluble second-anode. Strip entry structure 38 (FIG. 3) provides a vertical dam with a pliable curtain for entry of strip 30. Strip exit structure 39 provides interfitting blocks, one at each edge of a pair of entry cell exit rolls 40; such strip exit structure substantially blocks run-around of plating solution which is otherwise held back by exit rolls 40.

A raised surface level 41 for the plating solution is thus made possible in entry cell 34. Any slight escape of plating solution, at strip entry structure 38 or strip exit structure 39, is recovered at overflow station 42 and 43, respectively, for recycled usage. Circulation of plating solution includes return into entry cell 34, through conduit 44, which maintains the desired raised surface level 41.

Prior horizontally-oriented plating lines were limited to two-tier lines and tin-plating in the first tier was limited to the bottom surface of the strip, which is in confronting relationship with submerged anode bars, such as 45 and 46 of FIG. 3. Simultaneously tinplating both surfaces of a steel substrate in a single tier, as described herein, was not available prior to the present invention.

In a single tier, or on the first tier of a two-tier embodiment, ions for bottom surface plating are made available from soluble anode bars which extend, in uniformly spaced relationship from that bottom surface, across the full width of the strip, as described in U.S. Pat. No. 3,445,371 ANODE STRUCTURE FOR CONTINUOUS STRIP ELECTROPLATING (which is included herein by reference).

The present invention controls entry cell solution level as described in relation to FIG. 3 to enable submerging a soluble second-anode below the new elevated plating solution level 41. Such second-anode enables electrolytically tinplating the top surface of the steel substrate simultaneously with plating of the bottom surface using the submerged anode bars, (such as 45, 46, of FIG. 3).

Provisions are made for sufficient plating thickness, and continuity of top surface plating, to provide a protective barrier layer, which prevents access of the acidic plating solution to cause dissolution of surface iron, throughout the remainder of the initial tier of a horizontally-oriented plating line.

Such protective barrier layer is sustained as a continues layer during travel throughout plural plating cell tier 35 (FIG. 1); that is, such barrier layer, tinplated from the second-anode, is maintained within a preselected coating weight range, notwithstanding chemical action of acidic plating solution on such protective barrier layer.

In preferred practice, provision is made for separately controlling top surface plating in such entry cell so as to prevent dissolution of iron from both surfaces in the event of interruption of plating operations in which continuous-strip is suspended in plating solution.

Another objective is to provide for sufficient second-anode plating remaining on such top surface, after passage through such initial tier, so as to provide a coating weight in the range of about 0.02 to about 0.05 #/bb tin; such selection enables production of a new single-tier tin mill product, described in more detail later herein.

The soluble tin second-anode means for top surface plating, as taught herein, is provided with a power supply which is independent of the power supply for plating the bottom surface of the strip in plating cells of the initial tier of the horizontally-oriented plating line.

In order to provide for independent and sustained supply of stannous ions for plating such top surface, the invention provides pelletized tin, generally of spherical configuration (see FIGS. 4–6), and provides for control of plating solution level to enable such pelletized tin to be at least partially submerged in such plating solution in such entry cell. One or more tin pellet support structure units provide uniform spacing of such second-anode soluble tin pellets, from such remaining top surface of the continuous-strip which is opposed to the bottom surface plated from such submerged anode bars.

Preferably, plating practice with the soluble second-anode structure of the invention utilizes a plurality of individual soluble anode tin pellet units, in at least the entry cell, of a horizontally-oriented tinplating line. One of the objectives in providing a plurality of such second-anode structures is to decrease the size and weight of each, so as to decrease the support required for each. Individual units of the soluble-anode structure are preferably confined to the entry cell for a coating line and supplied from a single power bus; however, possible addition of top-surface second-anode structures to additional horizontally-oriented cells should not be excluded. Disposition of such plurality of individual second-anode structure units is best depicted in FIG. 3; details of each second-anode and support structure unit are disclosed in the detailed views of FIGS. 4–6; and construction and assembly are explained in more detail in relation to FIGS. 7–8.

In the specific embodiment of the entry cell of FIG. 3, three individual soluble-anode units are utilized, with power supplied to each from single bus bar 48. A length dimension on an elongated second-anode unit, such as 49, is shown by the cross-sectional view of FIG. 4. The length of the tin pellet containing portion is indicated by 52 and extends transversely across the full width of the continuous-strip. Further details of electrically-conductive anode materials and a conducting chamber for establishing bus bar 53 conduction at a longitudinal end of second-anode structure 49 can be seen, and are described in relation to FIG. 5. The cross-sectional view of FIG. 6 is in a plane (indicated by interrupted line 6—6 of FIG. 4) perpendicularly transverse to the elongated dimension of second-anode structure 49.

Figure 4:
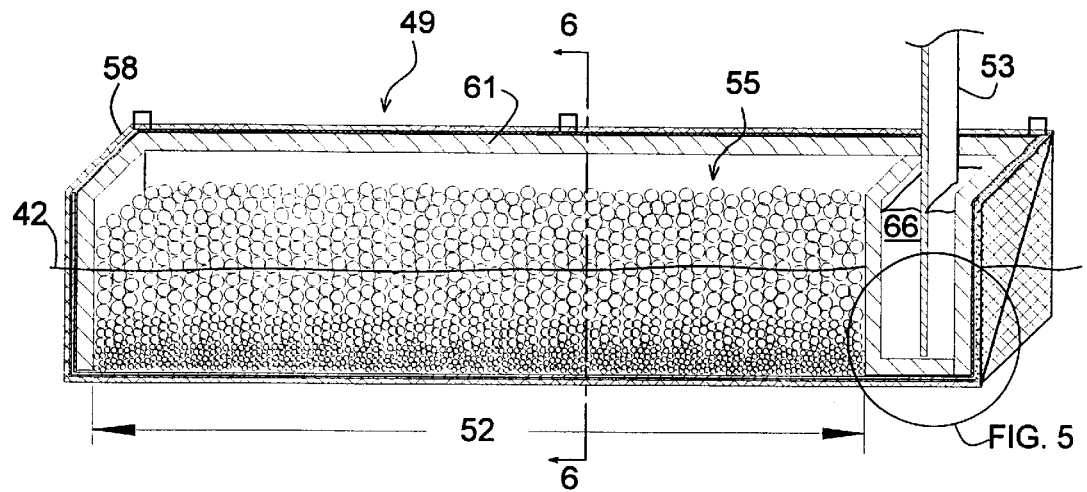
FIG. 4 is a detailed perspective view, in cross section, for describing features of a soluble second-anode structure of the invention.
Figure 6:
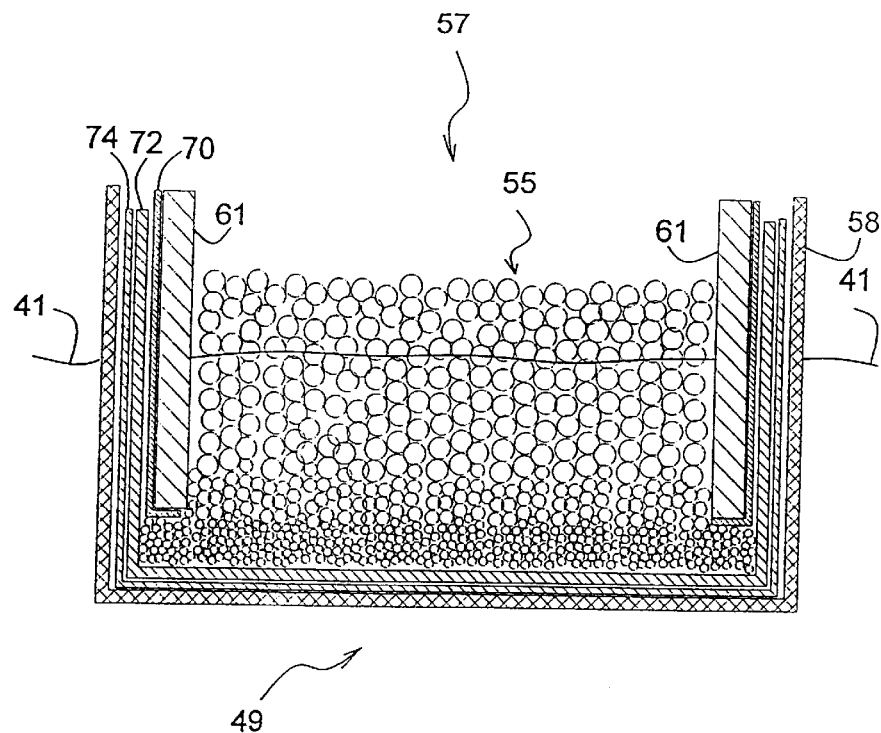
FIG. 6 is a cross-sectional view of such second-anode structure of the invention, taken along a plane indicated by interrupted line 6—6 of FIG. 4, for describing selected materials of the invention, and their function.

In FIGS. 4 and 6, it can be seen that substantially spherical tin pellets 55 can be introduced and replenished in the pellet containing portion though upper access opening 57 (indicated in FIG. 6).

The plating solution level established in entry cell 34 enables electrolytic submersion of second-anode units 49, 50, and 51 which are located sequentially in the direction of strip travel (FIG. 3). Each provides a source of stannous plating ions extending across the full width of the strip, as described in relation to FIG. 4. Each tin pellet containing portion presents a source of stannous ions in substantially parallel confronting relationship with the top surface of the continuous-strip. Power-supply bus bar 53 is located at a longitudinal end (shown in detail in FIG. 5) of each second-anode unit.

Figure 7:
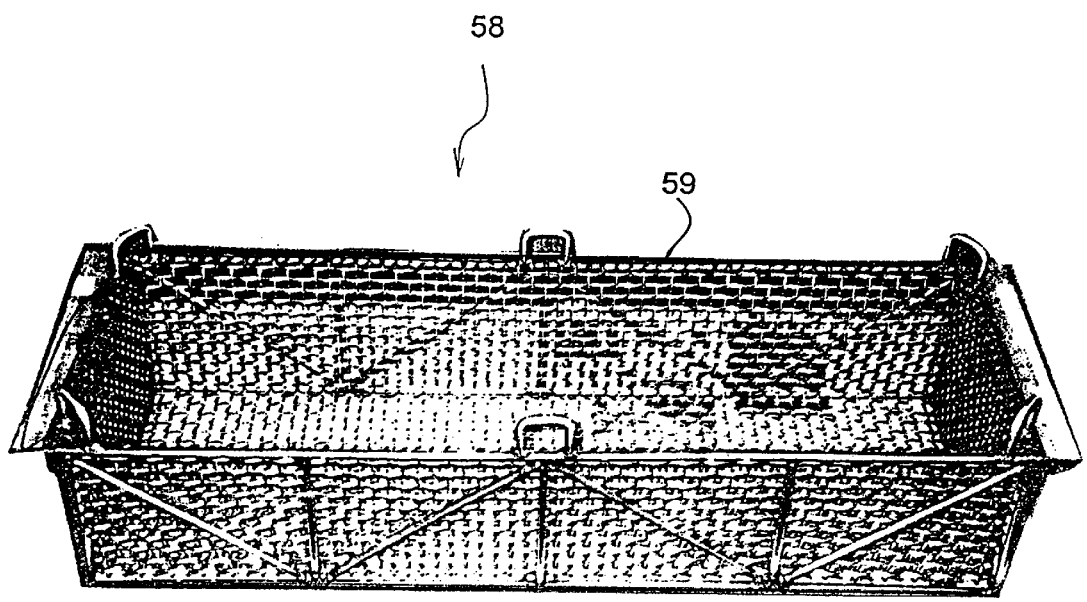
FIG. 7 is a perspective view of a second-anode support structure of the invention.

Referring to FIGS. 4–8, a substantially-rigid heavy-gauge woven-wire support structure 58 functions to contain each such unit. Two sidewalls, two end walls and a bottom wall are provided with open upper access 57 for introduction of the tin pellets. Sufficient strength and rigidity to support tin pellets 55, without distortion of the unit, is provided. In a preferred embodiment, heavy-duty woven-wire mesh (approximately 0.2" diameter steel wire) is used. Material for construction is selected to provide desired strength while maximizing openness (about ½") of the woven-wire for access of the plating solution to the tin pellets, after elec-trically insulating such support structures. In FIG. 7, such woven-wire mesh support structure 58 is shown, for clarity, in a cross-sectional perspective view absent other anode structure components. Such cross section corresponds to that of FIG. 4. For additional strength, woven-wire mesh can be reinforced with framework 59, primarily located at edges and corners, which can also be used to support the unit in the entry cell. In a preferred embodiment, steel rod is used for such reinforcement.

The woven-wire and reinforcing members of support structure 58 are coated with an electrically insulating material; and can, for example, be dip-coated with a plastisol (PVC) to provide a continuous coating on the woven-wire and framework, while maintaining desired mesh openness. Such insulation material is also selected to be inert to the acidic plating solution.

An electrically conductive graphite liner 60 (shown in plan view in FIG. 8) is fitted within the woven-wire support structure 58. Such graphite liner includes peripheral wall 61 along the sides and ends, dividing wall 62 and bottom wall 63. Graphite peripheral wall 61 (in part) and dividing wall 62 define the tin pellet containing portion and graphite peripheral wall 61 (in part), dividing wall 62 and bottom wall 63, (FIG. 5) define the electrically-conductive chamber 64 circumscribing bus bar 53 at a longitudinal end of the graphite liner. Graphite peripheral wall 61, dividing wall 62 and bottom wall 63 (FIG. 5) are assembled so as to provide conductivity between their contacting surfaces, to form an integral electrically-conductive graphite-lined structure for containing tin pellets 55 and electrically conductive chamber 64 for bus bar 53 connection.

During fabrication of the second-anode, electrical contact is established between electrically-conductive chamber 64 (FIG. 5) and bus bar 53 by pouring molten metal 66 (preferably tin) around bus bar 53 (preferably copper) to fill the compartment, and allowing the poured metal to solidify.

Dimension 52 (FIG. 4) of the elongated pellet containing portion of the graphite liner does not include the dimension of electrically-conductive chamber 64. Dimension 52 is selected to be at least equal to the width of the widest continuous-strip steel to be plated by such unit such that the top surface of the strip is confronted, edge to edge, by the tin pellet containing portion of the graphite lined second-anode.

Figure 8:
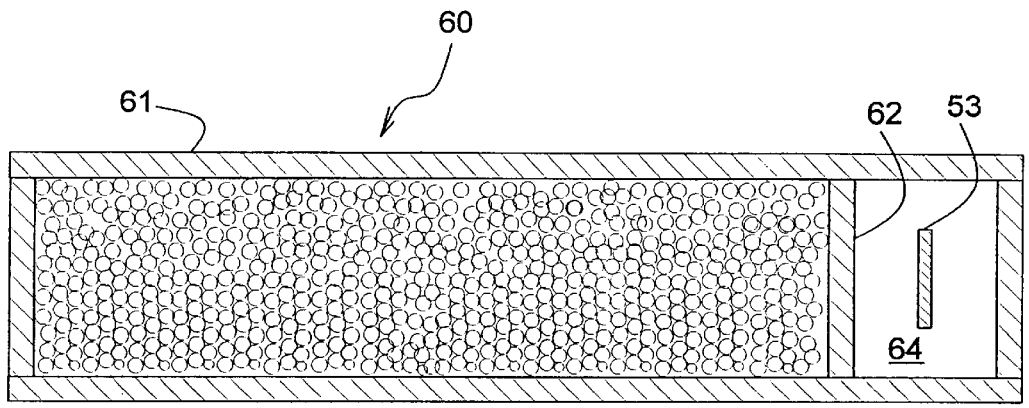
FIG. 8 is a schematic top plan view of a graphite liner structure of the invention for interfitting within the support structure of FIG. 7.

Such pellets are circumscribed by electrically-conductive graphite liner peripheral wall 61 and dividing wall 62 (FIG. 8). Graphite liner dividing wall 62 separates the pellet containing portion from conducting chamber 64. Support structure 58 extends beyond the longitudinal edges of plating cell 34 in order to be supported by additional structures.

In preparing for tinplating operations, tin pellets are supplied to substantially fill the volume defined by the graphite walls (FIG. 4). The pellets, as supplied, are initially substantially uniform in size and selected to be in the range of about one-half to one inch in diameter and of substantially spherical configuration. It should be noted in FIGS. 4 and 6 that the pellets start diminishing in size below plating solution surface level 41. As the tin pellets go into solution and decrease in volume, replacement pellets are periodically added to maintain a pellet depth of at least to, but preferably above, the plating solution surface level 41 shown in FIGS. 3–6.

Peripherally-located tin pellets make electrical contact at points of contact with the inner surfaces of the graphite liner; and, in turn, electrical conduction extends from pellet to pellet throughout the pellets within the graphite liner.

The outer surfaces of graphite liner walls 61, opposed to the pellet contacting surfaces, are coated with electrically insulating material 70 (such as PVC) to provide added protection against an electrical short circuit between the graphite liner and metal woven-wire support structure 58; or, with the continuous-strip substrate which is polarized to be cathodic in relation to the tin pellets of the graphite liner. Referring to the enlarged cross-sectional view of FIGS. 5 and 6, it should be noted that in addition to the outer vertical surfaces of the sidewalls and endwalls, the bottom horizontal surface of graphite bottom wall 63, is covered by electrical insulation 70 (such as PVC). The vertical dimension of the longitudinal graphite walls making up peripheral wall 61 is selected to be less than the full height of pellet support structure 58 (as seen in FIG. 6) such that tin pellets spread horizontally under the graphite walls, and, in that way confront the steel substrate with a maximum soluble anode area dimension for each anode unit. That is, the full width of each source of tin within each second-anode unit confronts the strip for plating.

Figure 5:
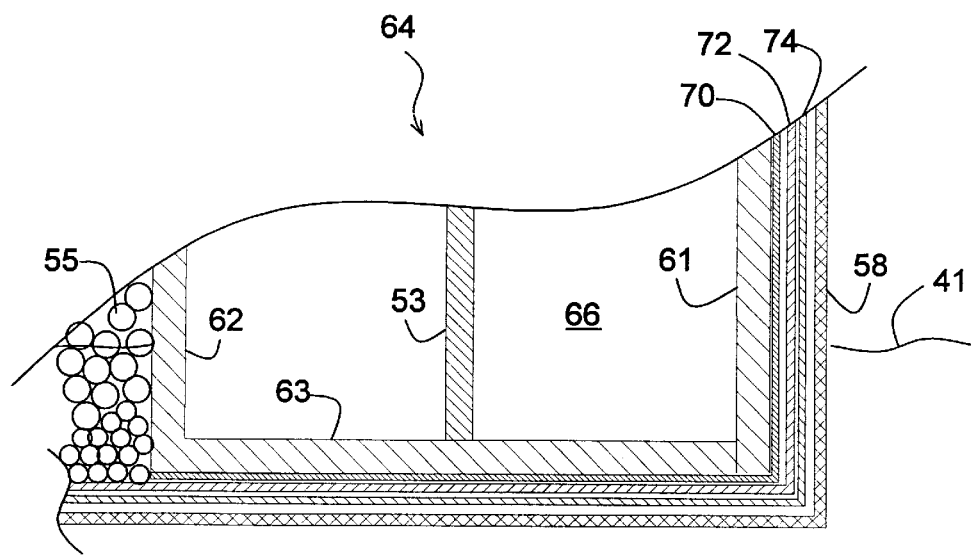
FIG. 5 is a detailed cross-sectional view of a portion of FIG. 4, indicated by the circle labeled "FIG. 5," for describing second-anode power supply features of the invention.

In addition to woven-wire support structure 58, which is provided with open mesh characteristics, support for diminishing size pellets having a size less than such open mesh is augmented by additional support means. As best seen in FIGS. 5 and 6, in a preferred embodiment a pair of support layers 72 and 74 are used. They include electrically-non-conductive mesh 72, comprising a material such as polypropylene, presenting a mesh opening size of about one-eighth to one-quarter inch and electrically-nonconductive, solution-penetrable liner material 74 located outboard of mesh 72 (FIGS. 5, 6).

Such liner material 74 confines tin, which has diminished to particulate size, to within the anode structure. These precautions are taken to prevent tin particulate contact with, and damage to, the tinplated surface.

Such solid particulate between the strip plated surface and the support structure, or passing between the electrical contact rolls, could damage the tinplating or cause and indentation on the strip surface. Solution penetrable "anode bag cloth" for such liner material allows free penetration of plating solution and free migration of tin ions but restricts solid particulate from exiting into the plating solution.

Such support layers 72, 74 in addition to extending along the bottom wall, as described, are extended upward along the side walls and end walls, so as to facilitate attachment at an upper edge of woven-wire structure 58, to eliminate any possibility of particulate exiting the unit near bottom corner portions of the graphite liner structure. In a preferred embodiment, support liners 72 and 74 are shaped to be fitted over the graphite liner. In a preferred embodiment, mesh material 72 is fitted over graphite liner 60 first, followed by anode cloth liner material 74. The graphite liner is thus encased prior to inserting it into woven-wire support structure 58. Although the sequence of support liners in the preferred embodiment is as described above, reversal of the order of the layers is not to be excluded. In still a third embodiment (not shown), such anode cloth material is outboard of the woven-wire support structure.

The invention provides for side-by-side placement of a plurality of such second-anode units (49, 50, 51 of FIG. 3) in the direction of substrate travel. Sufficient anode surface area is provided, in confronting relationship with the strip top surface, for electrolytically tinplating a barrier layer of sufficient thickness and continuity to prevent dissolution of iron from such top surface of the strip, during travel of the strip through a first, or single, tier of a horizontally-oriented plating line in which the bottom surface is being finish-surface tinplated using submerged tin anode bars. And, in another embodiment, the top surface plating is selected to provide about 0.02 to about 0.05 #/bb tin for processing as a new tin mill product.

Figure 9:
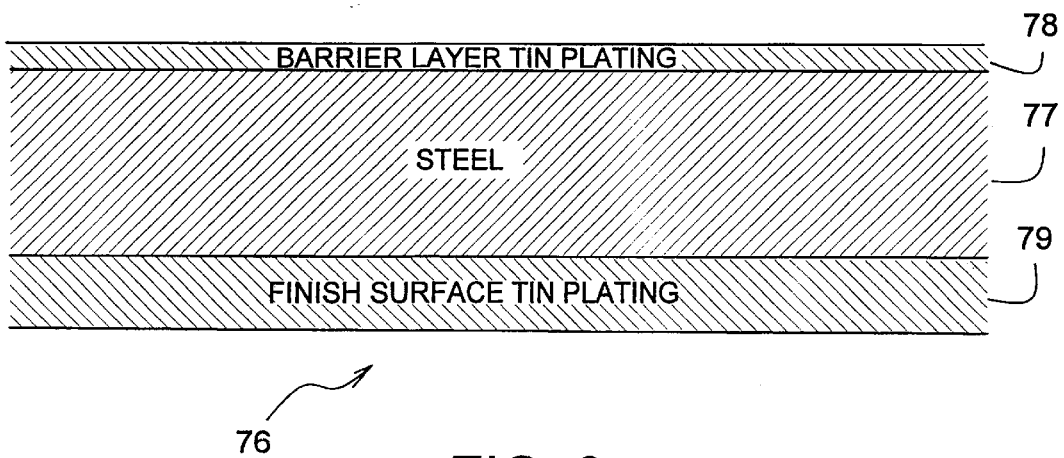
FIG. 9 is an enlarged cross-sectional view of a portion of a new electrolytically tinplated flat-rolled steel product of the invention made possible by the FIG. 2 single-tier embodiment of the invention.

Referring to FIG. 9, such new tin mill product 76 includes steel substrate 77, barrier layer tinplate 78 (about 0.02 to about 0.05 #/bb), and finish-surface tinplate 79, which can be selected for finish surface coating in a range of about 0.125 #/bb to about 0.75 #/bb.

Figure 10:
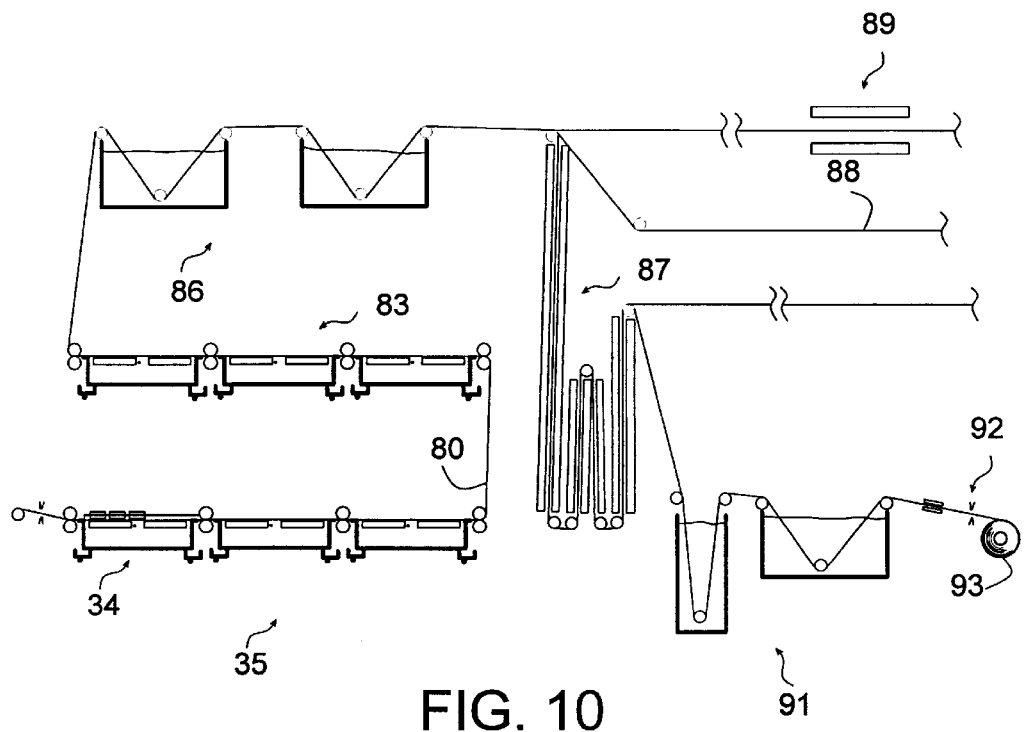
FIG. 10 is a diagrammatic elevational view, partially in cross section, of a two-tier horizontally-oriented electrolytic tinplating line of the invention.
Figure 11:
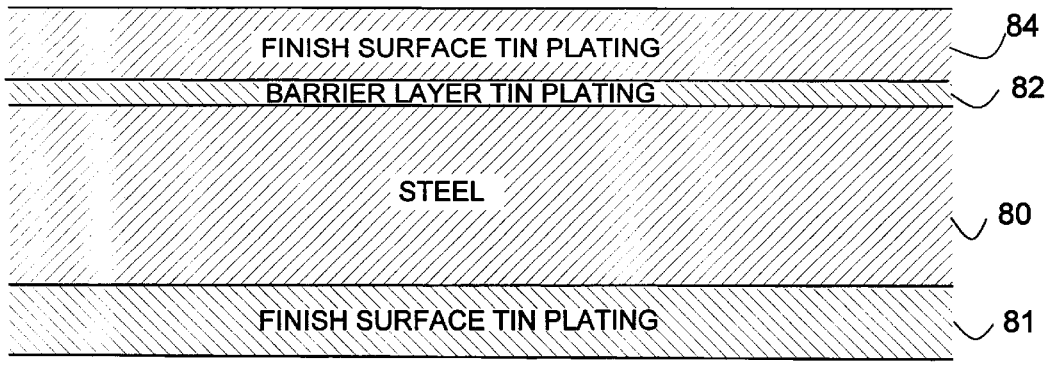
FIG. 11 is and enlarged cross-sectional view of a new electrolytically tinplated flat-rolled steel product of the FIG. 10 embodiment of the invention.

The single-tier plating line of FIG. 2, and the first tier of a two-tier horizontally oriented plating line shown in FIG. 10, can be identical. Each will include an entry cell, as shown in more detail in FIG. 3, for carrying out the functions of the second-anode as described in relation to FIGS. 4–6. FIG. 10 depicts a two-tier plating system and FIG. 11 depicts a new tin mill product of such system. In FIGS. 10 and 11, continuous-strip steel 80, which has been simultaneously plated on both planar surfaces in first tier 35 in order to provide finish surface tinplating 81 and barrier layer tinplating 82, is directed to second tier 83 for supplemental finish-surface plating 84 (FIG. 11) to form tin mill product 85 of FIG. 11. Supplemental finish-surface tinplating 84 is added to barrier layer 82 to provide a desired total plating weight of about 0.125 #/bb to 0.75 #/bb of plated surface.

Referring to FIGS. 1, 2, and 10, after plating in a single-tier, or in a two-tier horizontally-oriented plating line, the tinplated substrate is rinsed at plating solution recovery station 86. Flow-brightening can be selected at station 87 with barrier layer at least partially alloyed, or a matte finish, as plated, is available by passage along line 88; tin-iron alloy on each surface can also be provided by passage through heating structure 89. Tinplate surface can be delivered for surface passivation at station 91 and prepared for storage at station 92 and coiling as coil 93. In FIG. 1, such passivating treatment can be bypassed by delivery along line 94.

Tin mill product can be provided as follows:

(1) With an as-plated matte-finish tinplate on both surfaces of the products of FIGS. 9 and 11;
(2) with the barrier-layer alloyed with the steel substrate;
(3) with the tin-iron alloy on both plated surfaces of the substrate;
(4) flow-brightened surface on the heavy plated surface and barrier lay alloy on the remaining surface, and
(5) flow-brightened surface on each planar surface of the tin mill product.

For extended storage purposes, prior to additional in-line or sheet processing, any of the tinplated surfaces can be coated with a chrome oxide surface layer applied by either chemical dip treatment or electrolytic deposition at station 91 of FIGS. 1, 2 and 10.

Chemical treatment of the product is followed by rinsing and drying, followed by an electrostatically applied light coiling lube coating at station 92, prior to forming coil 93.

While specific materials, processing and fabrication steps have been set forth for purposes of describing embodiments of the invention, various modifications can be made in the light of the above teachings without departing from applicants novel contributions; therefore in determining the scope of the present invention, reference should be made to the claims.

What is claimed is:

1. Process for eliminating surface dissolution of iron during electrolytic tinplating of continuous-strip flat-rolled steel substrate in a horizontally-oriented plating line, comprising A. providing continuous-strip flat-rolled steel substrate of preselected width presenting opposed substantially-planar surfaces;

B. preparing such planar surfaces for electrolytic tinplating;

C. providing a horizontally-oriented electrolytic tinplating line with a plurality of plating cells sequentially located in-line, including an entry cell which provides sole access, for plating purposes, of such steel substrate into such tinplating line;

D. providing acidic stannous-ion electrolytic plating solution in such plurality of plating cells;

E. directing such continuous-strip for horizontally-oriented travel in which such opposed planar surfaces present a bottom surface and a top surface during such travel;

F. submerging soluble tin anode bar means in such plating solution in such plurality of plating cells including such entry cell, with such submerged anode bar means confronting such bottom surface of such steel substrate, in substantially-uniformly spaced relationship therefrom, across such preselected width of such continuous-strip flat-rolled steel substrate;

G. providing electrical power supply means for establishing plating current in such anode means in such plurality of plating cells;

H. locating roll means externally of such plurality of plating cells, for:
   (i) polarizing such strip cathodically in relation to such submerged anode means, and
   (ii) directing travel of such continuous-strip flat-rolled steel substrate horizontally, through such plurality of plating cells, with such bottom surface of such steel substrate confronting such submerged anode means;

I. controlling plating current established in such submerged anode means, for electrolytically tinplating such bottom surface of such steel substrate, confronting such submerged anode means, and J. substantially eliminating dissolution of iron from such top surface, into such acidic stannous-ion electrolytic plating solution in such plurality of plating cells, by carrying out the following steps:
   (i) modifying such entry cell for access into such horizontally-oriented plating line, by:
      (a) raising plating solution surface level in such entry cell, so as to enable
      (b) submersing a second soluble-tin anode means, confronting such remaining top surface of such steel substrate,
      (c) dissolving stannous ions, from such second anode means, into such plating solution for plating such top surface,
      (d) establishing plating current in such second-anode means, independently of establishing plating current in such submerged anode means,
      (e) electrolytically tinplating such top surface simultaneously with such bottom surface upon entry into such plating line, and
      (f) substantially preventing dissolution of strip surface iron into such plating solution.

2. The process of claim 1, including controlling power supply such second-anode means, to enable selecting of desired barrier-layer tinplating weight on such top surface, and establishing such barrier-layer tinplating weight to substantially eliminate dissolution of iron from such top surface, selected from the group consisting of A. during travel through such plurality of plating cells, and B. during interruption of travel through such plurality of plating cells.

3. The process of claim 1, further including controlling power supply to such second-anode means so as to sustain a tinplating weight in the range of about 0.02 to about 0.05 #/bb on such top surface, during travel through such plurality of plating cells for plating a desired tinplating weight, on such bottom surface of such steel substrate, from such submerged anode means.

4. The process of claim 1, including arranging such plurality of in-line horizontally-oriented electrolytic plating cells, to provide for
   A. passing such continuous-strip flat-rolled steel substrate through a plurality of plating cells in a first tier of such tinplating line for:
      (i) plating such bottom surface confronting such submerged anode means to a preselected finish-surface tinplating weight, and
      (ii) plating a barrier-layer tinplating on such upper surface of such steel substrate, followed by
   B. passing such continuous-strip flat-rolled steel substrate through a plurality of plating cells in a second tier of such tinplating line and
   C. electrolytically plating finish-surface tinplating on such barrier-layer tinplate remaining from such first tier pass to achieve a preselected total tinplating weight thereon.

5. The process of claim 1, including selecting such electrolytic plating solution from the group consisting of:

halogen-bath plating solution having a pH of about 3.5, and methylsufonic acid plating solution having a selected pH of about one, and in which preparing such planar surfaces for electrolytic tinplating includes surface cleansing of iron fines and associated debris from planar surfaces of such steel substrate, and removal of surface oxide from such cleansed surfaces for such electrolytic tinplating.

6. Process for electrolytic tinplating continuous-strip steel, comprising in combination A. providing flat-rolled steel strip having substantially-planar opposed surfaces B. directing such steel strip for horizontally-oriented travel so as to present a bottom surface and a top surface for plating;

C. providing a horizontally-oriented halogen-bath electrolytic tinplating line presenting an entry cell providing sole access for such steel strip into such line for plating purposes;

D. polarizing such steel strip cathodically for travel through such line;

E. directing horizontally-oriented travel of such steel strip through:
   (i) a plurality of horizontally-oriented electrolytic plating cells containing halogen-bath plating solution, in which
   (ii) stannous ions are provided in solution for electrolytic plating such bottom surface by establishing plating current in soluble tin anode means submerged in such halogen-bath plating solution, and (iii) electrolytically completing finish-surface tinplating, to a preselected plating weight, from such submerged anode means onto such bottom surface;

F. preventing dissolution of surface iron from such steel strip into such halogen-bath plating solution, by
(i) providing a separate soluble anode means, distinct from such submerged anode means, in such entry cell,
(ii) simultaneously tinplating such top surface, initiated upon entry into such horizontally-oriented tinplating line with a barrier layer of tin from such separate anode means which is distinct from tinplating of such bottom surface with such barrier layer of tin:
(iii) preventing access of plating solution to such top surface during travel through such tinplating line.

7. The process of claim 6, including
arranging such a plurality of plating cells into a first horizontally-oriented tier;
presenting such entry cell for introduction of steel strip into such first tier; and, separately controlling:
plating current established in such submerged anode means, and
plating current established in such separate soluble-anode means of such entry cell, so as to
prevent surface dissolution of iron from such steel strip surfaces in the event of interruption of electrolytic tinplating operations, which
interrupts steel strip travel through such horizontally-oriented tinplating line for a predetermined time period during which time period such steel strip is exposed to such halogen-bath plating solution.

8. The process of claim 6, including:
arranging such plurality of plating cells horizontally in a first tier for finish-surface tinplating such bottom surface of such steel strip;
selecting such finish-surface tinplating weight for such bottom surface, and
quantitatively controlling finish-surface electrolytic tinplating weight from such submerged anode means on such bottom surface in such first tier of such plurality of plating cells;
quantitatively controlling electrolytic barrier-layer tinplating weight from such separate-anode means on such top surface, and
selecting tinplating weight from such separate-anode means for such top surface, so as to provide for a preselected barrier-layer tinplating weight to remain on such top surface after passage through remaining electrolytic plating cells of such first tier.

9. The process of claim 8, further including
providing a plurality of plating cells arranged horizontally in a second tier, for
receiving steel strip from such first tier of plating cells with finish-surface tinplating on such bottom surface and such barrier-layer tinplating on such top surface, and
selecting finish-surface electrolytic tinplating to be added to such barrier-layer of tinplating on such top surface, so as to provide a preselected total tinplating weight on each such surface of such steel strip.

10. The process of claim 9, further including the step of
maintaining a selected antioxidant concentration in such halogen-bath plating solution, to substantially prevent oxidation due to oxygen being dragged into such plating solution by travel of such steel strip and to prevent conversion of stannous ions to stannic ions, by such oxygen, in such halogen-bath solution.

11. Electrolytically tinplated continuous-strip flat-rolled steel produced in accordance with the process of claim 3, 8, or 9.

12. Apparatus for electrolytically tinplating continuous-strip flat-rolled steel substrate, comprising, in combination
A. means for providing cold-reduced flat-rolled continuous-strip steel substrate presenting opposed substantially-planar surfaces;
B. means for preparing such surfaces for tinplating, including
(i) means for cleansing iron fines and debris associated with cold-reducing such steel, from such surfaces, and
(ii) means for removing oxide from such cleansed surfaces;
C. means for directing horizontally-oriented travel of such substrate so as to present a bottom surface and an opposite top surface for plating purposes,
D. a plating line, including:
(i) a plurality of horizontally-oriented in-line electrolytic tinplating cells, each including anode means adapted for submersion in plating solution confronting such bottom surface of such substrate for finish-surface tinplating thereof;
(ii) an entry plating cell which provides sole access, for plating purposes of such substrate, into such plating line, with such entry cell including, in addition to such anode means for tinplating such bottom surface:
(a) means for controlling plating solution surface level in such entry cell for submerging both surfaces of such substrate during travel through such entry cell, and
(b) a second-anode means, comprising
soluble tin pellets adapted to be submersed in such plating solution, confronting such top-surface, in contiguously-spaced relationship therewith;
E. plating-line roll means directing such substrate into such entry cell, for
horizontally-oriented travel intermediate anode means and such separate-anode means;
F. electrical power supply means for establishing plating current in such anode means and, independently, establishing plating current in such separate-anode means, with
such roll means polarizing such strip cathodically, in relation to both such anode means, and
G. means for controlling plating current in such submerged anode means and such separate-anode means so as to simultaneously electrolytically tinplate both such bottom and such top surface of such substrate in such entry cell.

13. The apparatus of claim 12, including
(i) a plurality of plating cells arranged in a horizontally-oriented first tier which includes such entry cell with such separate-anode means of soluble tin pellets, and
(ii) a plurality of plating cells arranged in a horizontally-oriented second tier,
(iii) means for directing travel of such substrate through such first tier of plating cells followed by travel through such second tier of plating cells, and
(iv) means for independently controlling electrolytic finish-surface tinplating in such first and second tier of plating cells.

14. The apparatus of claim 13, further including means for flow-brightening such finish-surface tinplating, selected from the group consisting of:
 (i) a single tinplated surface, and
 (ii) both tinplated surfaces.

15. Electrolytically tinplated continuous-strip flat-rolled steel substrate having:
 A. a substrate thickness gauge in the range of about 0.005" to about 0.015";
 B. a pair of substantially-planar opposed substrate surfaces;
 C. electrolytically applied tinplating on each substrate surface, with each such surface, being electrolytically tinplated simultaneously in a horizontally-oriented plating cell containing acidic stannous-ion electrolyte, and in which
 each such surface is electrolytically tinplated from an independently-powered anode means.

16. Halogen-bath plating solution for electrolytically tinplating elongated continuous-strip flat-rolled steel substrate, while traveling substantially-horizontally in the direction of its length through such plating solution; with a bottom planar surface confronting, and being tinplated, from tin-anode-bar means which are submerged in such plating solution, a top planar surface confronting, and being tinplated, from a separate tin pellet anode means which is suspended in such plating solution above such top planar surface, and in which such plating solution:
 (i) has a pH of about 3.5,
 (ii) is substantially free of iron ions resulting from dissolution of surface iron from such steel substrate,
 (iii) is substantially free of additive induced ferrocyanide precipitant resulting from plating solution dissolution of surface iron from such steel substrate during halogen-bath electrolytic tinplating operations.

17. Method for construction and assembly of separate-anode means and support structure for use in a horizontally-oriented electrolytic tinplating line for continuous-strip flat-rolled steel substrate traveling horizontally, in the direction of its length, so as to present a top surface and a bottom surface during travel through a plurality of horizontally-oriented plating cells containing acidic stannous-ions plating solution, comprising the steps of:
 A. fabricating an elongated support structure for top-surface plating means, in which such support structure, includes
  (i) a framework lined with heavy-gauge open-mesh woven-wire, presenting:
  (ii) elongated sidewall means, end wall means, and bottom wall means for support of tin pellets, while maintaining
  (iii) an accessible upper opening;
 B. electrically insulating such woven-wire support structure;
 C. assembling an elongated electrically-conductive interior liner for fitting within, and contiguous to, an interior periphery of such electrically-insulated woven-wire support structure defined by such side wall means, endwall means and bottom wall means of such support structure, with such liner
  (i) providing for and establishing an elongated electrically-conductive power-input chamber, extending from one longitudinal end of such liner, for holding tin pellets forming a top surface anode means,
  (ii) providing for and establishing an elongated electrically-conductive basket portion located at the remaining longitudinal end of such elongated liner, for holding tin pellets forming a second-anode, with
  (iii) such elongated basket portion extending across, and confronting, the full width of such top surface of such horizontally-oriented travel strip;
 D. providing solution-porous cloth-like material for internally circumscribing such basket portion within such elongated electrically-conductive liner,
 E. supporting such separate-anode means and tin anode pellets internally of and in electrical contact with such elongated conductive liner,
 F. establishing plating current in such tin pellets, with such cloth-like material
  permitting free access of plating solution and migration of stannous ions resulting from dissolution of such tin pellets,
 G. tinplating such steel substrate top surface from tin pellets within such solution-porous material by
  (i) submersing at least a portion of such tin pellets in plating solution of such entry cell, while
  (ii) preventing solid particulate tin from passing through the solution-porous material lining such basket portion so as to avoid contact of solid particulate with such strip.

18. The method of claim 17, including providing compacted rigid graphite for forming such separate-anode means, defining such basket portion with such graphite for receiving such solution-porous material liner and tin pellets, establishing a power supply chamber, for such separate-anode means, located within such elongated support structure, contiguous to such basket portion, and independently supplying electrical power for simultaneously plating such top and bottom substrate surfaces, and plating each such surface so as to prevent dissolution of surface iron, during interruption of continuous-strip steel substrate travel and tinplating operations.

* * * * *